(12) United States Patent
Scheerder et al.

(10) Patent No.: US 7,173,083 B2
(45) Date of Patent: Feb. 6, 2007

(54) POLYMER COMPOSITION COMPRISING A POLYMER HAVING A GRADIENT POLYMERIC MORPHOLOGY

(75) Inventors: Jurgen Scheerder, Holland (NL); Tijs Nabuurs, Holland (NL); Gerardus Cornelis Overbeek, Holland (NL); Alfred Jean Paul Buckmann, Holland (NL)

(73) Assignee: DSM IP Assets B.V., Heerien (NL)

( * ) Notice: Subject to any disclaimer, the term of this patent is extended or adjusted under 35 U.S.C. 154(b) by 120 days.

(21) Appl. No.: 10/488,698

(22) PCT Filed: Sep. 27, 2002

(86) PCT No.: PCT/GB02/04378

§ 371 (c)(1),
(2), (4) Date: Mar. 5, 2004

(87) PCT Pub. No.: WO03/029300

PCT Pub. Date: Sep. 27, 2002

(65) Prior Publication Data
US 2004/0236005 A1 Nov. 25, 2004

(30) Foreign Application Priority Data
Oct. 2, 2001 (GB) .................. 0123572.0

(51) Int. Cl.
*C09J 11/08* (2006.01)
*C09J 133/00* (2006.01)
*C09J 133/08* (2006.01)
*C08J 201/00* (2006.01)

(52) U.S. Cl. .............. 524/501; 524/502; 524/515; 526/87

(58) Field of Classification Search .......... 524/504, 524/515, 501, 502; 526/87
See application file for complete search history.

(56) References Cited

U.S. PATENT DOCUMENTS 5,639,805 A * 6/1997 Park et al. ............... 523/201
6,140,431 A * 10/2000 Kinker et al. ............ 526/79

FOREIGN PATENT DOCUMENTS

JP 09031139 A * 2/1997
WO WO 97/12921 4/1997

OTHER PUBLICATIONS

Machine Translation to claims in JP 09031139 (Feb. 1997).*

* cited by examiner

*Primary Examiner*—Kelechi C. Egwim
(74) *Attorney, Agent, or Firm*—Morgan Lewis & Bockius LLP

(57) ABSTRACT

An aqueous composition comprising components: (A) 50 to 99 wt. % of a vinyl polymer(s) having a gradient polymeric morphology; and (B) 1 to 50 wt. % of at least one polymer not having a gradient polymeric morphology, wherein components (A) and (B) add up to 100%.

15 Claims, 1 Drawing Sheet

POLYMER COMPOSITION COMPRISING A POLYMER HAVING A GRADIENT POLYMERIC MORPHOLOGY The present invention relates to certain aqueous compositions comprising 50 to 99 wt. % of vinyl polymers having a gradient polymeric morphology and to their use in coating applications.

A vinyl polymer having a gradient polymeric morphology is a vinyl polymer having a continually changing monomeric compositional content. The preparation of vinyl polymers having a gradient morphology is well known in the art. U.S. Pat. No. 3,804,881 discloses a process for preparing vinyl polymers having a gradient polymeric morphology where the process comprises polymerising at least one primary polymerizable monomer feed varying in compositional content by continuously adding at least one different secondary polymerizable monomer feed. This disclosure describes a wide variety of configurations that can be used to prepare polymers having a gradient polymeric morphology. U.S. Pat. No. 4,039,500 also discloses a process for controlling particle morphology and the molecular weight distribution of vinyl polymers. U.S. Pat. No. 6,140,431 discloses a further process for the preparation of continuously variable composition copolymers, in particular for use in lubricating oil additives.

WO 97/12921 discloses a seed polymerised latex having a gradient polymeric morphology and a process for making such a process. U.S. Pat. No. 4,111,876 discloses a blend of up to 15 wt. % of a polymer derived from styrene, acrylonitrile and acrylate ester monomers having a gradient polymeric morphology and the remainder comprising a poly(vinyl chloride) resin, to provide greater impact resistance, however U.S. Pat. No. 4,111,876 also teaches that use of more than 15 wt. % of the polymer having a gradient polymeric morphology negates any improvement.

There is an increasing requirement to significantly reduce or eliminate volatile organic contents (VOC's) in aqueous polymer compositions due to the environmental toxicity and flammability problems associated with VOC's. However up to now the use of a certain amount of organic coalescing solvent in the final composition has been found to aid film-formation on coating of the composition onto the substrate. It has also been found difficult to achieve a composition containing no or very little coalescing solvent but still having a good balance of properties conventionally required in most coating applications such as high hardness and a low minimum film forming temperature (MFFT).

We have now invented an aqueous composition providing an advantageous combination of MFFT, hardness and elasticity.

According to the present invention there is provided an aqueous composition comprising in admixture components:
(A) 50 to 99 wt. % of a vinyl polymer(s) having a gradient polymeric morphology; and
(B) 1 to 50 wt. % of at least one polymer not having a gradient polymeric morphology;
wherein components (A) and (B) add up to 100%.

Preferably the aqueous composition of the invention comprises 60 to 95 wt. % of component (A) and 5 to 40 wt. % of component (B), more preferably 70 to 90 wt. % of component (A) and 10 to 30 wt. % of component (B), and most preferably 75 to 90 wt. % of component (A) and 10 to 25 wt. % of component (B).

Vinyl polymers are derived from free radically polymerisable olefinically unsaturated monomers (herein defined as vinyl monomers) and can contain polymerised units of a wide range of such vinyl monomers, especially those commonly used to make binders for the coatings industry.

Component A, the vinyl polymer(s) having a gradient morphology may be prepared by any of the process variations described in U.S. Pat. No. 3,804,881 (incorporated herein by reference). A gradient polymeric morphology may be obtained by the polymerisation of at least a first monomer feed and a different second monomer feed.

A typical process for preparing a vinyl polymer(s) having a gradient polymeric morphology comprises introducing a first monomer feed to a reactor, where the first monomer feed continually varies in its composition due to the addition of a different second monomer feed to the first monomer feed and polymerising the monomers introduced into the reactor.

The addition of the second monomer feed to the first monomer feed may be in parallel to the introduction of the first monomer feed to the reactor (i.e. both feeds start and end at the same time). Alternatively the start of the first monomer feed to the reactor may precede the start of the addition of the second monomer feed to the first monomer feed for example when preparing a vinyl polymer using a seeded polymerisation process, or both monomer feeds may be started simultaneously but the time taken for the addition of the second monomer feed to the first monomer feed may exceed the time taken for the introduction of the first monomer feed to the reactor. The seed may comprise up to 10 wt. % of the first monomer feed.

A gradient polymeric morphology may also be obtainable from a process comprising simultaneously introducing a first monomer feed and a different second monomer feed into a reactor where the rate of introduction of the first monomer feed varies with respect to the rate of introduction of the second monomer feed and polymerising the monomers introduced into the reactor.

The at least two monomer feeds used to prepare the vinyl polymer(s) having a gradient polymeric morphology usually differ in composition. The difference between the at least two monomer feeds may be any, including for example a difference in glass transition temperature (Tg), monomer functionality (for example the use of crosslinking, acid functional or adhesion promoting monomers), hydrophilicity, refractive index, molecular weight or simply a variation in the concentration of the respective monomers in each monomer feed. If there is a Tg difference between the at least two monomer feeds, the resulting vinyl polymer(s) having a gradient polymeric morphology may lack a clearly definable measured glass transition temperature (Tg) because of the continually changing monomeric compositional content.

Examples of vinyl monomers which may be used to form vinyl polymer(s) having a gradient polymeric morphology include but are not limited to 1,3-butadiene, isoprene, styrene, α-methyl styrene, divinyl benzene, acrylonitrile, methacrylonitrile, vinyl halides such as vinyl chloride, vinylidene halides such as vinylidene chloride, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula wherein $R^1$ is H or methyl and $R^2$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, trifluoroethyl(meth)acrylate, dimethyl aminoethyl methacrylate and hydroxyalkyl (meth)acrylates such as hydroxyethyl acrylate, hydroxy ethylmethacrylate, 2-hydroxypropyl methacrylate, 2-hydroxypropyl acrylate, 4-hydroxybutyl acrylate, 4-hydroxybutyl methacrylate and their modified analogues like Tone M-100 (Tone is a trademark of Union Carbide Corporation).

Olefinically unsaturated monocarboxylic acids, sulphonic acids such as 2-acrylamido-2-methyl-propane sulphonate (AMPS) and/or dicarboxylic acids, such as acrylic acid, methacrylic acid, β-carboxy ethyl acrylate, fumaric acid and itaconic acid, and monomers such as N-methylol(meth)acrylamide, methoxy polyethyleneoxide(meth)acrylate and (meth)acrylamide may also be used.

The vinyl monomer may optionally contain functional groups to contribute to the crosslinking of the vinyl polymer(s) having a gradient polymeric morphology in the coating. Examples of such groups include maleic, epoxy, fumaric, acetoacetoxy such as acetoacetoxyethyl methacrylate, β-diketone, unsaturated fatty acid, acryloyl, methacrylol, styrenic, (meth)allyl groups, mercapto groups, keto or aldehyde groups (such as methylvinylketone, diacetoneacrylamide and (meth)acroleine).

Particularly preferred are vinyl polymer(s) having a gradient polymer morphology made from a monomer system comprising at least 40 wt. % of one or more monomers of the formula $CH_2=CR^1COOR^2$ as defined above. Such preferred vinyl polymer(s) are defined herein as acrylic polymer(s). More preferably, the monomer system contains at least 50 wt. % of such monomers, and particularly at least 60 wt. %. The other monomers in such acrylic polymer(s) (if used) may include one or more of the other vinyl monomers mentioned above, and/or may include ones different to such other monomers. Particularly preferred monomers include butyl acrylate (all isomers), butyl methacrylate (all isomers), methyl methacrylate, ethyl hexyl methacrylate, esters of (meth)acrylic acid, acrylonitrile, vinyl acetate and styrene.

In a preferred embodiment the vinyl polymer(s) having a gradient polymeric morphology is prepared from at least a first monomer feed and a different second monomer feed.

Preferably either the first monomer feed and/or the second monomer feed comprises composition (a):
  i) 10 to 90 wt. %, more preferably 20 to 80 wt. % and most preferably 25 to 70 wt. % of $CH_2=CR^1-COOR^2$ wherein $R^1$ is H or methyl and $R^2$ is optionally substituted alkyl or cycloalkyl of 1 to 20 carbon atoms;
  ii) 0 to 40 wt. %, more preferably 0 to 30 wt. % and most preferably 0 to 25 wt. % of styrene;
  iii) 0 to 15 wt. %, more preferably 0 to 10 wt. % and most preferably 0 to 6 wt. % of acid functional vinyl monomer(s);
  iv) 0 to 10 wt. %, more preferably 0 to 7 wt. % and most preferably 0 to 5 wt. % of crosslinking functional vinyl monomer(s);
  v) 0 to 5 wt. %, more preferably 0 to 4 wt. % and most preferably 0 to 3 wt. % of chain transfer agent(s);
  vi) 0 to 20 wt. %, more preferably 0 to 15 wt. % and most preferably 0 to 10 wt. % of vinyl monomer(s) not in i) to v);
  where i)+ii)+iii)+iv)+v)+vi) add up to 100%; and
  wherein said second monomer feed is different from said first monomer feed.

Preferably either the first monomer feed and/or the second monomer feed comprises composition (b):
  i) 10 to 90 wt%, more preferably 20 to 80 wt. % and most preferably 25 to 70 wt. % of $CH_2=CR^1-COOR^2$ wherein $R^1$ is H or methyl and $R^2$ is optionally substituted alkyl or cycloalkyl of 1 to 20 carbon atoms;
  ii) 0 to 40 wt. %, more preferably 0 to 30 wt. % and most preferably 0 to 25 wt. % of styrene;
  iii) 2 to 20 wt. %, more preferably 2 to 15 wt. % and most preferably 2 to 10 wt. % of acid functional monomer(s);
  iv) 0 to 30 wt. %, more preferably 0 to 20 wt. % and most preferably 0 to 15 wt. % of crosslinking functional monomer(s);
  v) 0 to 10 wt. %, more preferably 0 to 5 wt. % and most preferably 0 to 3 wt. % of chain transfer agent(s);
  vi) 0 to 20 wt. %, more preferably 0 to 15 wt. % and most preferably 0 to 10 wt. % of vinyl monomer(s) not in i) to v);
  where i)+ii)+iii)+iv)+v)+vi) add up to 100%; and
  wherein said second monomer feed is different from said first monomer feed.

Most preferably when the first monomer feed comprises composition (a), the different second monomer feed comprises composition (b) and when the first monomer feed comprises composition (b) the different second monomer feed comprises composition (a).

Preferably the weight ratio of the first monomer feed to the second different monomer feed is in the range of from 70:30 to 30:70.

The vinyl polymer(s) having a gradient polymeric morphology may be prepared by any known technique including those discussed above and may include directly synthesising the vinyl polymer(s) in water (for example by emulsion polymerisation, micro-suspension polymerisation or mini emulsion polymerisation). Methods for preparing aqueous vinyl polymer(s) are reviewed in the Journal of Coating Technology, volume 66, number 839, pages 89 to 105 (1995) and these methods are included herein by reference.

Component (B), the at least one polymer not having a gradient polymeric morphology may be any polymer known in the art including but not limited to vinyl polymers such as polyvinyl acetate, polybutadiene, (meth)acrylic polymers prepared by chain transfer polymerisation, acrylic polymers containing styrene, acrylonitrile, 2-(dimethylamino)ethyl methacrylate (DMAEMA) and or methacrylamide monomers; polyvinyl(di)chloride, polymers containing VEVOVA monomers (available from Resolution); fluorinated vinyl polymers and acrylic polymers; vinyl chloride/acrylonitrile resins; hybrids such as polyurethane acrylic hybrids, alkyd acrylic hybrids and polyester acrylic hybrids; hyperbranched polymers such as dendrimers; oils such as saturated and unsaturated oils; hollow particles (available under the name Ropaque); polymers disclosed in EP 758364 and EP 758347 incorporated herein by reference; waxes such as paraffin; melamine resins; phenolic resins; Lumiflon resins (available from Avecia Ltd); silicone resins; polycarbonate resins; polyamide resins; polyketone resins; polyether resins; Haloflex resins (available from Avecia Ltd); hydroxy functional resins as a used in two pack iscocyanate applications; polyurethanes; autoxidisably crosslinkable polymers and UV curable polymers. Component (B) is preferably in the form of an aqueous dispersion. By keeping the solvent low the amount of volatile organic coalescents are reduced. Preferably component (B) is selected from the group comprising:
  (i) vinyl polymer(s) having a $Tg \geq 50°$ C. and a particle size $\leq 150$ nm;

(ii) water-dissipatable polyurethane(s);
(iii) UV curable polymer(s); and
(iv) autoxidisably crosslinkable polymer(s);

Component (B) if a vinyl polymer, may be prepared by a seeded polymerisation process.

If component (B) is a vinyl polymer selected from (i) then component (B)(i) may be formed from vinyl monomers as described herein for the preparation of the vinyl polymer(s) having a gradient polymeric morphology. Component (B)(i) may be a multistage vinyl polymer or preferably may be a single stage vinyl polymer.

Preferably component (B)(i) has a theoretical Tg≧60° C., more preferably ≧70° C. and most preferably ≧90° C. Preferably component (B)(i) has a particle size≦140 nm, more preferably ≦100 nm and most preferably ≦60 nm. Preferably component (B)(i) has a weight average molecular weight≧100,000 Daltons. Preferably component (B)(i) has an acid value from 0 to 50 mg KOH/g.

Methods for preparing component (B)(ii) are known in the art and are described in for example the Polyurethane Handbook $2^{nd}$ Edition, a Carl Hanser publication, 1994, by G. Oertel; and these methods are included herein by reference. The polyurethane polymer(s) may be prepared in a conventional manner by reacting an organic polyisocyanate(s) with a compound(s) carrying isocyanate-reactive groups (also known as isocyanate-reactive compounds) by methods well known in the prior art. Isocyanate-reactive groups include —OH, —SH, —NH—, and —NH$_2$.

Suitable polyisocyanates include aliphatic, cycloaliphatic, araliphatic and/or aromatic polyisocyanates. Examples of suitable polyisocyanates include ethylene diisocyanate, 1,6-hexamethylene diisocyanate, isophorone diisocyanate, cyclohexane-1, 4-diisocyanate, 4,4'-dicyclohexylmethane diisocyanate, p-xylylene diisocyanate, α,α'-tetramethylxylene diisocyanate, 1,4-phenylene diisocyanate, 2,4-toluene diisocyanate, 2,6-toluene diisocyanate, 4,4'-diphenylmethane diisocyanate, polymethylene polyphenyl polyisocyanates, 2,4'-diphenylmethane diisocyanate, 3(4)-isocyanatomethyl-1-methyl cyclohexyl isocyanate and 1,5-naphthylene diisocyanate. Mixtures of polyisocyanates can be used and also polyisocyanates which have been modified by the introduction of urethane, allophanate, urea, biuret, carbodiimide, uretonimine, urethdione or isocyanurate residues.

Suitable isocyanate-reactive compounds include organic polyol(s) optionally bearing crosslinker groups or hydrophilic water-dispersing groups.

The organic polyols include diols and triols and mixtures thereof but higher functionality polyols may be used, for example as minor components in admixture with diols. The polyols may be members of any of the chemical classes of polyols used or proposed to be used in polyurethane formulations. In particular the polyols may be polyesters, polyesteramides, polyethers, polythioethers, polycarbonates, polyacetals, polyolefins or polysiloxanes. Preferred polyol molecular weights are from 250 to 6000, more preferably from 500 to 3000. Low molecular weight organic compounds containing at least one (preferably at least two) isocyanate-reactive groups and having a weight average molecular weight up to 500, preferably in the range of 40 to 250 can also be used. Examples include ethyleneglycol, neopentyl glycol, 1-propanol, and 1,4-cyclohexyldimethanol.

Isocyanate-reactive organic compound(s) bearing crosslinker groups include isocyanate-reactive organic compounds bearing fatty acid groups which may be obtained by using techniques known in the art, e.g. from the reaction of a suitable fatty acid with a hydroxyl donor (preferably an alcohol or polyol) or amine donor to provide a compound bearing fatty acid groups).

Isocyanate-reactive compound(s) bearing a non-ionic and/or ionic hydrophilic water-dispersing group(s) (or group which may be subsequently easily converted to such a water-dispersing group, e.g. by neutralisation—such a group still being termed a water-dispersing group for the purposes of this invention) may be used as a reactant in the preparation of the polyurethane polymer. Examples of such compounds include carboxyl group containing diols and triols, for example dihydroxy alkanoic acids such as 2,2-dimethylolpropionic acid or 2,2-dimethylolbutanoic acid. Examples of preferred compounds bearing non-ionic hydrophilic water-dispersing groups include methoxy polyethylene glycol (MPEG) with number average molecular weights of for example 350, 550, 750, 1000 and 2000, as described in EP 0317258.

When an polyurethane polymer is prepared, it is conventionally formed by reacting a a stoichiometric excess of the organic polyisocyanate(s) with the isocyanate-reactive compound(s) under substantially anhydrous conditions at a temperature between about 30° C. and about 130° C. until reaction between the isocyanate groups and the isocyanate-reactive groups is substantially complete; the ratio of isocyanate groups to isocyanate-reactive groups preferably being of from about 1:4 to about 4:1, more preferably of from about 1:2 to 2:1.

If desired, catalysts such as dibutyltin dilaurate and stannous octoate, zirconium or titanium based catalysts may be used to assist the polyurethane polymer(s) formation. An organic solvent may optionally be added to control the viscosity. Examples of solvents include water-miscible solvents such as N-methylpyrrolidone, dimethyl acetamide, glycol ethers such as butyldiglycol, methyl ethyl ketone and alkyl ethers of glycol acetates or mixtures thereof. Preferably no organic solvents are added.

The polyurethane polymer(s) may be dispersed in water using techniques well known in the art. Preferably, the polyurethane polymer(s) is added to the water with agitation or, alternatively, water may be stirred into the polyurethane polymer(s).

Alternatively if an isocyanate-terminated polyurethane prepolymer is prepared and dispersed in an aqueous medium the prepolymer may be chain extended with active hydrogen-containing chain extender in the aqueous phase.

Active hydrogen-containing chain extenders which may be reacted with the isocyanate-terminated polyurethane prepolymer include amino-alcohols, primary or secondary diamines or polyamines, hydrazine, and substituted hydrazines. Water itself may be effective as an indirect chain extender.

Where the chain extender is other than water, for example a polyamine or hydrazine, it may be added to the aqueous dispersion of the isocyanate-terminated polyurethane prepolymer or, alternatively, it may already be present in the aqueous medium when the isocyanate-terminated polyurethane prepolymer is dispersed therein.

Surfactants and or high shear can be utilised in order to assist in the dispersion of the polyurethane polymer(s) in water. Suitable surfactants include but are not limited to conventional anionic, cationic and/or non-ionic surfactants such as Na, K and NH$_4$ salts of dialkylsulphosuccinates, sulphated oils, alkyl sulphonic acids, alkyl sulphates, fatty acids such as Na stearate and Na oleate. Other anionic surfactants include alkyl or (alkyl)aryl groups linked to sulphonic acid groups, phosphonic acid groups, or carboxylic acid groups. Cationic surfactants include alkyl or (alkyl) aryl groups linked to quaternary ammonium salt groups. Non-ionic surfactants include polyglycol ether compounds and polyethylene oxide compounds.

Component (B)(iii) may be any type of ultraviolet curable (UV) polymer(s) including for example polyether, polyurethanes, and vinyl polymers as are well known in the art. The UV curability results from the presence of olefinically unsaturated bonds and takes place by a free-radical mechanism. Olefinic unsaturation in a polymer may be obtained from the use of ethylenically unsaturated epoxides, for example epoxide (meth)acrylate; (methyl)acrylol groups; imines and ethylenically unsaturated epoxides or imines and ethylenically unsaturated isocyanates, as described for example in WO 95/00560. Preferably component (B)(iii) is based on polyurethanes or polyesters having unsaturated moieties and on multifunctional acrylic polymers.

The radiation used for curing the UV curable polymer may be any suitable form of radiant energy but is preferably UV radiation. In principle electron-beam, gamma radiation, x-rays or visible radiation could be used. When curing is effected by UV radiation, the composition of the invention will normally include at least one photoinitiator, usually present in an amount 0.1 to 10 wt. % based on the weight of the UV curable polymer.

Examples of UV photoinitiators include halogenated polynuclear ketones such as chlorosulphonated benzanthones, chlorosulphonated fluorenones, alpha-haloalkylated benzanthones, alpha-haloalkylated fluorenones and alkyl phenones. Accelerator compounds may be included if desired to enhance the cure rate.

Component (B)(iv) may be any autoxidisably crosslinkable polymer(s). Autoxidisably crosslinkable polymers are polymers which crosslink on exposure to oxygen. The unsaturation present in autoxidisable polymers imparts latent crosslinkability so that when a coating composition thereof is dried in air (often in conjunction with a drier salt) the composition undergoes crosslinking, thereby improving its properties such as mechanical properties (improved hardness and durability) and chemical resistance.

Autoxidisably crosslinkable polymers are well known in the art and include alkyds; oils; fatty acid functionalised urethanes (also known as uralkyds); unsaturated polyesters; and polymers with latent autoxidative functionality. Polymers bearing acetoacetoxy groups may also undergo autoxidative crosslinking after reaction with amine functional compounds. A further advantage of coatings containing unsaturated fatty acid residues is an improved glossy appearance. EP 379007, EP 0017199 and EP 647644 all describe a one component emulsion which contain autoxidisable polymers with carboxylic acid groups to provide water dispersibility.

Autoxidisably crosslinkable polyurethane polymers containing unsaturated fatty acid residues are preferably obtained from the reaction of at least one polyisocyanate with at least one isocyanate-reactive compound bearing unsaturated fatty acid residue(s), optionally (but preferably) with isocyanate-reactive compounds bearing water-dispersing groups and optionally isocyanate-reactive compounds bearing neither unsaturated fatty acid residue(s) nor water-dispersing groups.

The autoxidisably crosslinkable polyurethanes polymer may be prepared in a conventional manner by reacting the organic polyisocyanate(s) with the isocyanate-reactive compound(s) by methods well known in the prior art and as described above for component (B) (ii).

Preferred isocyanate-reactive compounds bearing unsaturated fatty acid residue(s) which may be used in the urethane synthesis may be obtained from the reaction, using techniques known in the art, of a suitable fatty acid with a hydroxyl donor (preferably an alcohol or polyol) or amine donor to provide a fatty acid residue-bearing compound with at least one (preferably at least two) hydroxyl or amine isocyanate-reactive groups.

Preferred fatty acids include fatty acids derived from castor oil, soybean oil, sunflower oil, tallow oil, linseed oil and fatty acids such as linoleic acid, palmitoleic acid, linolenic acid, oleic acid, oleosteric acid, licanic acid, arachidonic acid, ricinoleic acid and/or mixtures thereof.

In the aqueous composition of the present invention component (A) and/or component (B) may also utilise further crosslinking mechanisms known in the art.

Examples include but are not limited to Schiff base crosslinking and silane condensation. By Schiff base crosslinking is meant that crosslinking takes place by the reaction of carbonyl functional group(s) such as an aldehyde, ketone or acetoacetyl group with a carbonyl-reactive amine or hydrazine (or blocked amine or hydrazine) functional group. By silane condensation is meant the reaction of alkoxy silane or —SiOH groups in the presence of water, to give siloxane bonds by the elimination of water and/or alkanols during the drying of the aqueous composition. Further examples include two component isocyanate crosslinking and acid groups crosslinking with epoxy, carbodiimide, aziridine and/or oxazoline groups.

Preferably components (A) and (B) are prepared separately and are subsequently blended together to prepare the aqueous composition of the invention.

The aqueous composition of the invention preferably has a solid contents of from about 20 to 60% by weight, more preferably from about 25 to 45% by weight.

A co-solvent, as is well known in the coating art, is an organic solvent employed in an aqueous composition to improve the drying characteristics thereof. The co-solvent may be solvent incorporated or used during preparation of components (A) and/or (B) or may have been added during formulation of the aqueous composition.

Preferably the aqueous composition of the invention comprises 0 to 15 wt. % of co-solvent, more preferably 0 to 10 wt. %, most preferably 0 to 5 wt. % and especially 0 to 1 wt. % of co-solvent by weight of components (A) and (B). Preferably the aqueous composition of the invention comprises no co-solvent added during the formulation of the aqueous composition.

Drier salts preferably comprise part of the composition if component (B) is autoxidisably crosslinkable ie. Component (B)(iv). Examples include polyvalent salts containing cobalt, calcium, copper, zinc, iron, zirconium and manganese as the cation and halides, nitrates, sulphates, acetates, napthenates or acetoacetonates as the anion. The amount of drier used is usually in the range from 0 to 1% metal content by weight of component (B)(iv).

The aqueous composition of the invention may contain other conventional ingredients including organic solvents, pigments, dyes, emulsifiers, surfactants, thickeners, heat stabilisers, levelling agents, anti-cratering agents, fillers, sedimentation inhibitors, UV absorbers, antioxidants, waxes and the like introduced at any stage of the production process or subsequently. It is possible to include an amount of an antimony oxide in the composition to enhance the fire retardant properties.

The aqueous composition of the invention may be advantageously employed as coating compositions (e.g. protective or adhesive coating compositions) or inks, for which purpose they may be further diluted with water and/or organic solvents, or they may be supplied in more concentrated form by evaporation of water and/or organic of the liquid medium. As coating compositions, they may be applied to any substrate including wood, metals, glass, cloth, leather, paper, plastics, foam and the like, by any conventional method including brushing, dipping, flow coating, spraying, and the like. According to the present invention there is also provided the use of the aqueous composition of the invention as a coating composition.

The aqueous composition of the invention may also be used as adhesives for materials such as polypropylene, polyester, polyurethane, leather and the like or as binding agents for various particulate materials.

According to the present invention there is provided a coating obtained from an aqueous composition of the present invention.

In another embodiment of the present invention there is provided an adhesive obtained from an aqueous composition of the present invention.

There is still further provided according to the invention a substrate coated with the aqueous composition of the present invention.

Figure 1:
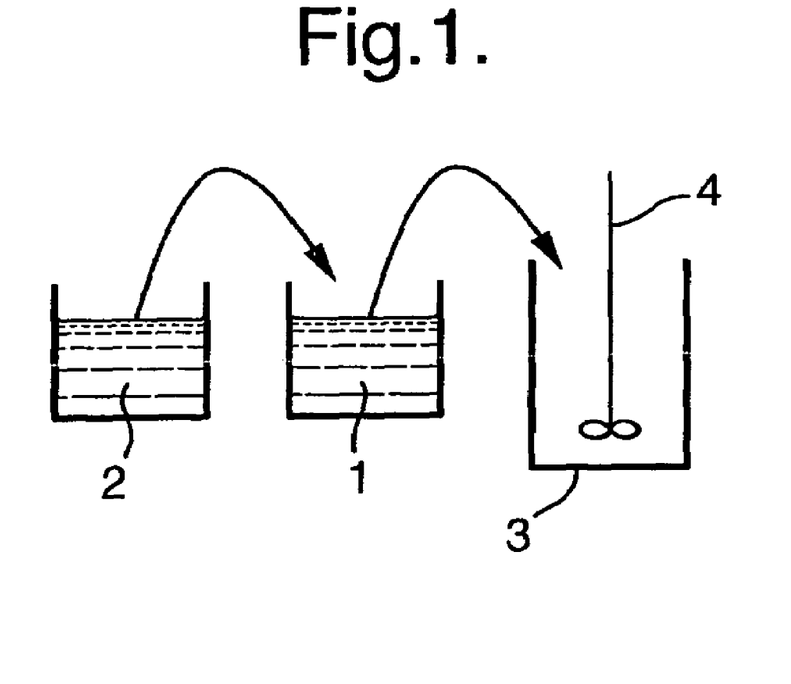
FIGS. 1 and 2 illustrate processes for preparing vinyl polymers having a gradient polymeric morphology.

FIG. 1 is a block diagram illustrating the process for preparing a vinyl polymer having a gradient polymeric morphology where a first monomer feed (1) is introduced into a reactor (3) with a stirrer (4) and simultaneously a second monomer feed (2) is added to the first monomer feed (1).

Figure 2:
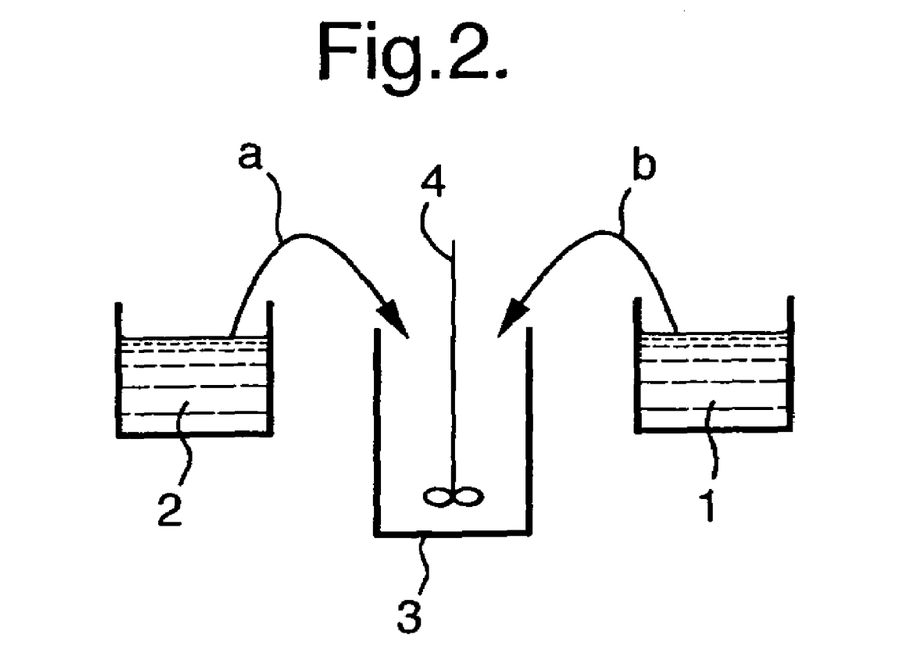

FIG. 2 is a block diagram illustrating the process for preparing a vinyl polymer having a gradient polymeric morphology where a first monomer feed (1) and a second monomer feed (2) are introduced simultaneously at different rates (a) and (b) into a reactor (3) equipped with a stirrer (4).

The present invention is now illustrated by reference to the following examples. Unless otherwise specified, all parts, percentages and ratios are on a weight basis. Examples denoted with a "C" are comparative examples.

Preparation of Vinyl Polymers having a Gradient Polymeric Morphology (VPG) Vinyl Polymer having a Gradient Polymeric Morphology (VPG1)

A round-bottomed flask equipped with a condenser, thermometer and mechanical stirrer (the reactor) was charged with 490.8 parts of water and 5.2 parts of sodium lauryl sulphate. At room temperature 5 parts of a first monomer feed consisting of 153.6 parts of water, 118.3 parts of methyl methacrylate (MMA), 193.4 parts of butyl acrylate (BA), 77.9 parts of butyl methacrylate (BMA) and 23.4 parts of sodium lauryl sulphate was added to the reactor. Then 30% of a catalyst feed consisting of 3.9 parts of ammonium persulphate (AP) and 255.9 parts of water was added to the reactor and the mixture was heated to 85° C.

As soon as the temperature reached 85° C. the second monomer feed addition, consisting of 153.6 parts of water, 202.4 parts of methyl methacrylate, 78.1 parts of butyl acrylate, 77.9 parts of butyl methacrylate, 31.2 parts of methacrylic acid (MAA), and 23.4 parts of sodium lauryl sulphate into the first monomer feed vessel was started and addition from the first monomer feed vessel into the reactor was started simultaneously. The feed rate from the second monomer feed vessel into the first monomer feed vessel and the feed rate from the first monomer feed vessel into the reactor were the same. The entire monomer addition took 90 minutes. Together with the monomer addition the remainder of the catalyst feed was added and this took 100 minutes. At the end of the addition of the catalyst feed 100.0 parts of water were used to rinse the feed tank and were added to the reactor. A temperature of 85° C. was maintained for 30 minutes after which 1.4 parts of a 30 w/w % solution of t-butyl hydroperoxide (tBHPO) in water and 8.4 parts of a 5 w/w % solution of iso-ascorbic acid were added to initiate polymerisation of any remaining free monomer. The temperature was kept at 85° C. for another 30 minutes after which the emulsion was cooled to room temperature.

At room temperature the emulsion was neutralised to a pH of 7 using a 25% solution of ammonia in water and 0.9 parts of Proxel BD was added to prevent bacterial contamination of the emulsion.

The resulting emulsion had a solids content of 39.5%, a pH of 7.0, a viscosity of 12 mPa·s, and an average particle size of 104 nm.

Vinyl polymer 2 (VPG2), Vinyl polymer 3 (VPG3) and Vinyl polymer 4 (VPG4) were prepared using the same procedure described above for the preparation of VPG1 using the components listed in Table 1 below.

TABLE 1

| Components (g) | VPG2 | VPG3 | VPG4 |
|---|---|---|---|
| First Monomer Feed | | | |
| Water | 153.6 | 153.6 | 153.6 |
| Methyl methacrylate | 75.5 | 245.3 | 202.4 |
| Butyl acrylate | 205.1 | 66.5 | 78.1 |
| Butyl methacrylate | 77.9 | 77.9 | 77.9 |
| Methacrylic acid | 31.2 | — | 31.2 |
| Sodium lauryl sulphate | 23.4 | 23.4 | 23.4 |
| Second Monomer Feed | | | |
| Water | 153.6 | 153.6 | 153.6 |
| Methyl methacrylate | 245.3 | 75.5 | 118.3 |
| Butyl acrylate | 66.5 | 205.1 | 193.4 |
| Butyl methacrylate | 77.9 | 77.9 | 77.9 |
| Methacrylic acid | — | 31.2 | — |
| Sodium lauryl sulphate | 23.4 | 23.4 | 23.4 |
| Emulsion properties | | | |
| Solids content (%) | 39.1 | 39.9 | 39.7 |
| PH | 6.7 | 7.0 | 6.8 |
| Viscosity (mPa.s) | 12 | 8 | 12 |
| Average particle size (nm) | 98 | 140 | 124 |

Further Preparation of Vinyl Polymers having a Gradient Polymeric Morphology, VPG6 to VPG14

A round-bottomed flask equipped with a condenser, thermometer and mechanical stirrer was charged with 552.0 parts of water and 4.5 parts of Aerosol GPG, (sodium dioctyl sulphosuccinate surfactant available from American Cyanamid). The reactor contents were heated to 50° C. at which temperature a certain percentage (as listed below in Table 2) of the first monomer feed was added to the reactor. The amounts and monomers used for the first and second monomer feeds are listed in Table 2. The reaction mixture was further heated to 70° C. at which point 30% of the initiator feed was added. The total initiator feed comprised 83.3 g of a 3% AP solution. The mixture was then further heated to 85° C. at which point the feeding of the second monomer feed into the first monomer feed and simultaneously feeding of the first monomer feed into the reactor started. At the same time the initiator feed was started. The entire monomer and initiator addition took 120 minutes. The reactor was kept at 85° C. for another 30 minutes followed by a post-reaction using 1.4 of a 30% tBHPO solution together with 8.3 gram of a 5% iso-ascorbic acid solution followed by another 30 minutes holding period. Finally, the pH was adjusted to around 8 using 12.5% ammonia.

which 1.4 parts of a 30 w/w % solution of t-butyl hydroperoxide in water and 8.4 parts of a 5 w/w % solution of iso-ascorbic acid were added to initiate polymerisation of

TABLE 2

| Component (g) | VPG5 | VPG6 | VPG7 | VPG8 | VPG9 | VPG10 | VPG11 | VPG12 | VPG13 | VPG14 |
|---|---|---|---|---|---|---|---|---|---|---|
| First monomer feed | | | | | | | | | | |
| Water | 71.4 | 107.1 | 142.9 | 107.1 | 142.9 | 142.9 | 107.1 | 107.1 | 105.6 | 35.2 |
| Aerosol GPG | 2.7 | 4.0 | 5.4 | 4.0 | 5.4 | 5.4 | 4.0 | 4.0 | 4.0 | 1.3 |
| MMA | 131.3 | 215.4 | 287.2 | 215.4 | 262.6 | 287.2 | 197.0 | 215.4 | 240.7 | 80.4 |
| BMA | 18.7 | 22.1 | 29.5 | 22.1 | 37.4 | 29.5 | 28.0 | 22.1 | — | — |
| MAA | 8.3 | 12.5 | 16.7 | 12.5 | 16.7 | 16.7 | 12.5 | 12.5 | 5.7 | 1.9 |
| MAAM | 8.3 | — | — | — | 16.7 | — | 12.5 | — | — | — |
| Amount of seed | 0% | 5% | 10% | 0% | 5% | 0% | 10% | 5% | 5% | 5% |
| Second monomer feed | | | | | | | | | | |
| Water | 285.7 | 250.0 | 214.3 | 250.0 | 214.3 | 214.3 | 250.0 | 250.0 | 246.4 | 316.8 |
| Aerosol GPG | 1.4 | 1.4 | 1.4 | 9.4 | 8.0 | 8.0 | 9.4 | 9.4 | 9.2 | 11.9 |
| MMA | 223.6 | 195.6 | 137.5 | 207.1 | 207.7 | 244.9 | 285.7 | 242.3 | 186.6 | 239.8 |
| BA | 443.1 | — | — | 347.1 | 292.3 | 255.1 | 297.6 | 341.0 | 106.6 | 137.0 |
| MAAM | — | — | 25.0 | 29.2 | — | — | — | — | — | — |
| BMA | — | — | — | — | — | — | — | — | 213.2 | 274.1 |
| 2-EHA | — | — | — | — | — | — | — | — | 26.7 | 34.3 |
| MAA | — | — | — | — | — | — | — | — | 13.2 | 17.0 |
| DAAM | — | — | — | — | — | — | — | — | 28.7 | 37.0 |
| Emulsion properties | | | | | | | | | | |
| Solids (%) | 42.5 | 42.5 | 42.5 | 42.5 | 42.5 | 42.5 | 42.5 | 42.5 | 42.5 | 42.5 |
| Viscosity (mPa.s) | 24 | 43 | 39 | 32 | 32 | 35 | 37 | 40 | 32 | 40 |
| pH | 8.1 | 8.3 | 7.9 | 8.0 | 8.2 | 8.4 | 8.3 | 8.3 | 8.6 | 8.4 |

Key:
MAAM = methacrylamide, 2-EHA = 2-ethyl hexyl acrylate
DAAM = diacetone acrylamide Preparation of Sequential Vinyl Polymers (SVP) Sequential Vinyl Polymer (SVP15)

A round-bottomed flask equipped with a condenser, thermometer and mechanical stirrer (reactor) was charged with 490.8 parts of water and 5.2 parts of sodium lauryl sulphate. At room temperature 5% of a first monomer feed consisting of 153.6 parts of water, 118.3 parts of methyl methacrylate, 193.4 parts of butyl acrylate, 77.9 parts of butyl methacrylate and 23.4 parts of sodium lauryl sulphate was added. Then 30% of a catalyst feed consisting of 3.9 parts of ammonium persulphate and 255.9 parts of water was added and the mixture was heated to 85° C.

As soon as the temperature reached 85° C. feeding of the first monomer feed and of 50% of the remaining catalyst feed into the reactor were started. The first monomer feed was added over a period of 45 minutes, while the catalyst feed took 55 minutes. After complete addition of the first monomer feed the temperature was kept at 85° C. for 30 minutes to ensure complete polymerisation of monomers. Next the addition of a second monomer feed consisting of 153.6 parts of water, 202.4 parts of methyl methacrylate, 78.1 parts of butyl acrylate, 77.9 parts of butyl methacrylate, 31.2 parts of methacrylic acid, and 23.4 parts of sodium lauryl sulphate and the remaining catalyst feed were started. The second monomer feed took 45 minutes, while the remaining catalyst was fed in 55 minutes. At the end of the addition of the catalyst feed 100.0 parts of water were used to rinse the feed tank and were added to the reactor. A temperature of 85° C. was maintained for 30 minutes after any remaining free monomer. The temperature was kept at 85° C. for another 30 minutes after which the emulsion was cooled to room temperature.

At room temperature the emulsion was neutralised to a pH of around 7 using a 25% solution of ammonia in water and 0.9 parts of Proxel BD was added to prevent bacterial contamination of the emulsion.

The resulting emulsion had a solids content of 39.6%, a pH of 6.6, a viscosity of 11 mPa·s, and an average particle size of 115 nm.

Sequential vinyl polymer 16 (SVP16), sequential vinyl polymer 17 (SVP17) and sequential vinyl polymer 18 (SVP18) were prepared using the same procedure described above for the preparation of SVP15 using the components listed in Table 3 below.

TABLE 3

| Components (g) | SVP16 | SVP17 | SVP18 |
|---|---|---|---|
| First Monomer Feed | | | |
| Water | 153.6 | 153.6 | 153.6 |
| Methyl methacrylate | 75.5 | 245.3 | 202.4 |
| Butyl acrylate | 205.1 | 66.5 | 78.1 |
| Butyl methacrylate | 77.9 | 77.9 | 77.9 |
| Methacrylic acid | 31.2 | — | 31.2 |
| Sodium lauryl sulphate | 23.4 | 23.4 | 23.4 |
| Second Monomer Feed | | | |
| Water | 153.6 | 153.6 | 153.6 |
| Methyl methacrylate | 245.3 | 75.5 | 118.3 |
| Butyl acrylate | 66.5 | 205.1 | 193.4 |

TABLE 3-continued

| Components (g) | SVP16 | SVP17 | SVP18 |
|---|---|---|---|
| Butyl methacrylate | 77.9 | 77.9 | 77.9 |
| Methacrylic acid | — | 31.2 | — |
| Sodium lauryl sulphate | 23.4 | 23.4 | 23.4 |
| Emulsion properties | | | |
| Solids content (%) | 40.2 | 39.3 | 40.0 |
| pH | 7.0 | 6.9 | 7.0 |
| Viscosity (mPa.s) | 17 | 10 | 14 |
| Average particle size (nm) | 105 | 127 | 124 |

Vinyl Polymer Containing Particles with a High Tg and a Small Particle Size (VP19)

A round-bottomed flask equipped with a condenser, thermometer and mechanical stirrer was charged with 1288.6 parts of water, 44.3 parts of sodium lauryl sulphate and 2.9 parts of ammonium persulphate. This mixture was heated to 50° C. At 50 C 5% of a monomer feed consisting of 548.3 parts of methyl methacrylate and 28.8 parts of 2-hydroxyethyl methacrylate was added and the mixture was further heated to 85° C. As soon as the reaction temperature was reached the remaining monomer feed was added over a period of 60 minutes. At the end of the addition of the monomer feed 15.2 parts of water were used to rinse the feed tank and were added to the reactor. A temperature of 85° C. was maintained for 60 minutes after which the emulsion was cooled to room temperature. At room temperature the emulsion was neutralised to a pH of 7.4 using a 25% solution of ammonia in water and 2.0 parts of Proxel BD mixed with 11.4 parts of water were added to prevent bacterial contamination of the emulsion.

The resulting emulsion had a solids content of 29.7%, a pH of 7.4, a viscosity of 14 mpa·s, a calculated Tg of 101° C. and an average particle size of 54 nm.

Urethane Polymer, Self-dispersible, Carboxylic Acid Stabilised (UP20)

A round-bottomed flask equipped with a thermometer and mechanical stirrer was charged with 304.7 parts of isophorone diisocyanate, 40.0 parts of dimethylol propionic acid (DMPA), 455.3 parts of polypropylene glycol mixture (Voranol; OH value=76.6 mg KOH/g; Dow Benelux, The Netherlands) and 0.15 parts of tin octoate and the reaction mixture was slowly heated to 95° C. under a dry air atmosphere. The reaction mixture was held at this temperature until the NCO content was 7.59%. Subsequently 24.79 parts of triethylamine were added to the reaction mixture. 650 parts of the reaction mixture was dispersed into a mixture of 1040 parts of water containing 16 parts of a nonyl phenol ethoxylate (Igepal C0 -630; Rhodia, Belgium) during 1 hour to form an aqueous dispersion of the NCO-terminated prepolymer. Thereafter 26.5 parts of hydrazine were added as a 64.5% solution in water to chain-extend the NCO-terminated prepolymer.

The resulting translucent polyurethane dispersion had a solids content of 38.6% and a pH of 7.3.

UV-curable Carboxylic Acid Stabilised Polyurethane Polymer (UV-UP21)

A round-bottomed flask equipped with a thermometer and mechanical stirrer was charged with 330.7 parts of isophorone diisocyanate, 37.5 parts of dimethylol propionic acid (DMPA), 52.5 parts of an acryloyl functional polyol CN104 (OH number=233.9 mg KOH/g; Cray Valley, France), 329.3 parts of a polyester diol S-1063-120 (OH number=120 mg KOH/g; Occidental Chemical, Belgium), 0.15 parts of 2,6-di-tert-butyl-4-methylphenol (Ionol CP) and 0.15 parts of tin octoate and the reaction mixture was slowly heated to 95° C. under a dry air atmosphere. The reaction mixture was held at this temperature until the NCO content was 8.04%. Subsequently 28.3 parts of triethylamine were added to the reaction mixture. 500 parts of the reaction mixture was dispersed into 905 parts of water during 1 hour to form an aqueous dispersion of the NCO-terminated prepolymer. Thereafter 22.9 parts of hydrazine were added as a 64.5% solution in water to chain-extend the NCO-terminated prepolymer.

The resulting translucent polyurethane dispersion had a solids content of 34.6% and a pH of 8.0. The unsaturated bond functionality was 0.57 mmoles C=C/g polymer.

Autoxidisable Polymer (AP22)

Dynotal LS82, available from Dyno ASA, Norway was used for AP22 with an oil length of 82% wherein the fatty acids consisted of soybean oil fatty acid and linseed oil fatty acid.

Vinyl Polymer Containing Particles with a High Tg and a Small Particle Size (VP23)

NeoCryl XK-25, available from NeoResins, Avecia BV was used as supplied. NeoCryl is a trademark of Avecia BV.

NeoCryl XK-25 has a measured Tg>80° C. and a particle size<50nm.

Autoxidisable Polymer AP24

Bayhydrol B130, a water reducible, oxidatively drying styrene-butadiene resin, available from Bayer was used for AP24. Bayhydrol is a trademark of Bayer.

Urethane Polymer 25 (UP25)

Bayhydrol VP LS2342, a polyurethane dispersion available from Bayer was used for UP25.

Alkyd Polymer 26 (AP26)

Uradil az 554z-50, an alkyd dispersion available from DSM Resins was used for AP 26. Uradil is a trademark of DSM Resins.

UVF-curable Vinyl Polymer 27 (UV-VP27)

Lux 352, a UV curable aqueous acrylic dispersion, available from Alberdingk Boley was used for UV-VP27. Lux is a tradename of Alberdingk Boley.

Analytical Methods

Surface Hardness

König hardness was determined following DIN 53157 NEN 5319 using an Erichsen hardness equipment. The values are given in seconds (s).

MFFT

The minimum film formation temperature (°C.) was determined using DIN 53787 using a Sheen MFFT bar SS3000.

Particle Size

Average particle sizes were determined using a Malvern Zetasizer 3000HSa.

Elasticity and Toughness

On a 200×300 mm glass plate 400 μm films were applied using a bird blade applicator (model 288). The films were dried for 16 hours at ambient temperature followed by ageing of the film for 16 hours at 50° C. The glass plates were submersed in water to release the clear films which were subsequently dried at 50° C. during 16 hours. From each film 5 standard tensile test specimens were produced using a DIN 52-910-53 puncher. A Instron tensile test instrument was used. The elasticity and toughness were determined at a crosshead speed of 100 mm/min, and a sample rate of 20.00 pts/sec and are the mean value of 5 test specimens. The thickness of the test specimens varied between 80–100 μm. The determination was carried out at 20° C. and a relative humidity of 60%.

EXAMPLES

Examples 1 to 4, 9 and 10 of the present invention comprising blends of the vinyl polymers having a gradient polymeric morphology (VPG1–4) with VP19 (vinyl polymer small particle size, high Tg) and comparative examples 5 to 8, 11 and 12 comprising blends of the sequential vinyl polymers (SVP15–18) with VP19 were made in w/w % blend ratios of 90:10 and 70:30 as shown below in Table 4. Examples 1 to 4, 9 and 10 show an improved balance of physical properties.

TABLE 4

| VPG or SVP | VPG % or SVP % | VP9 % | MFFT (° C.) | surface hardness (s) | toughness (MPa) | elasticity (%) |
|---|---|---|---|---|---|---|
| EX. 1 | VPG1 | 90 | 10 | 33 | 62 | 2.0 | 147 |
| EX. 2 | VPG2 | 90 | 10 | 30 | 69 | 10.6 | 100 |
| EX. 3 | VPG3 | 90 | 10 | 30 | 69 | 12.7 | 93 |
| EX. 4 | VPG4 | 90 | 10 | 31 | 55 | 1.8 | 142 |
| CEX. 5 | SVP15 | 90 | 10 | 62 | 71 | 1.1 | 13 |
| CEX. 6 | SVP16 | 90 | 10 | 30 | 45 | 1.5 | 107 |
| CEX. 7 | SVP17 | 90 | 10 | 27 | 52 | 0.8 | 80 |
| CEX. 8 | SVP18 | 90 | 10 | 34 | 49 | 0.7 | 54 |
| EX. 9 | VPG1 | 70 | 30 | 26 | 92 | — | — |
| EX. 10 | VPG2 | 70 | 30 | 28 | 74 | — | — |
| CEX. 11 | SVP15 | 70 | 30 | 60 | 80 | — | — |
| CEX. 12 | SVP16 | 70 | 30 | 27 | 60 | — | — |

Examples 13, 14 and 17 to 19 of the present invention comprising blends of the vinyl polymers having a gradient polymeric morphology (VPG1–4) with UP20 (urethane polymer) and comparative examples 15, 16 and 20 and 21 comprising blends of the sequential vinyl polymers (SVP16 and 18) with UP20 were made in w/w % blend ratios of 90:10 and 70:30 as shown below in Table 5. Examples of the invention in Table 5 show an improvement in surface hardness.

TABLE 5

| VPG or SVP | VPG % or SVP % | UP20 %. | MFFT (° C.) | surface hardness (s) |
|---|---|---|---|---|
| EX. 13 | VPG2 | 90 | 10 | <5 | 62 |
| EX. 14 | VPG3 | 90 | 10 | <5 | 64 |
| CEX. 15 | SVP16 | 90 | 10 | <5 | 53 |
| CEX. 16 | SVP17 | 90 | 10 | <5 | 52 |
| EX. 17 | VPG2 | 70 | 30 | <5 | 52 |
| EX. 18 | VPG3 | 70 | 30 | <5 | 55 |
| EX. 19 | VPG4 | 70 | 30 | <5 | 56 |
| CEX. 20 | SVP16 | 70 | 30 | <5 | 43 |
| CEX. 21 | SVP17 | 70 | 30 | <5 | 38 |

Examples 22 to 24 and 28 to 30 of the present invention comprising blends of the vinyl polymers having a gradient polymeric morphology (VPG1–4) with UV-UP21 (UV curable polymer) and comparative examples 25 to 27 and 31 to 33 comprising blends of the sequential vinyl polymers (SVP15–18) with UV-UP21 were made in w/w % blend ratios of 90:10 and 70:30 as shown below in Table 6. Examples of the invention shown in Table 6 show an improvement in surface hardness.

TABLE 6

| VPG or SVP | VPG % or SVP % | UV-UP21 % | MFFT (° C.) | surface hardness (s) |
|---|---|---|---|---|
| EX. 22 | VPG2 | 90 | 10 | <5 | 105 |
| EX. 23 | VPG3 | 90 | 10 | <5 | 98 |
| EX. 24 | VPG4 | 90 | 10 | <5 | 95 |
| CEX. 25 | SVP16 | 90 | 10 | <5 | 71 |
| CEX. 26 | SVP17 | 90 | 10 | <5 | 70 |
| CEX. 27 | SVP18 | 90 | 10 | <5 | 85 |
| EX. 28 | VPG1 | 70 | 30 | <5 | 116 |
| EX. 29 | VPG2 | 70 | 30 | <5 | 118 |
| EX. 30 | VPG3 | 70 | 30 | <5 | 112 |
| CEX. 31 | SVP15 | 70 | 30 | <5 | 105 |
| CEX. 32 | SVP16 | 70 | 30 | <5 | 87 |
| CEX. 33 | SVP17 | 70 | 30 | <5 | 87 |

Examples 34, 35, 38 and 39 of the present invention comprising blends of the vinyl polymers having a gradient polymeric morphology (VPG1–4) with AP22 (autoxidisable polymer) and comparative examples 36, 37, 40 and 41 comprising blends of the sequential vinyl polymers (SVP15–18) with AP22 were made in w/w % blend ratios of 90:10 and 70:30 as shown below in Table 7. Examples of the invention shown in Table 7 show an improvement in the MFFT/surface hardness balance.

TABLE 7

| VPG or SVP | VPG % or SVP % | AP22 % | MFFT (° C.) | Surface hardness (s) |
|---|---|---|---|---|
| EX. 34 | VPG1 | 90 | 10 | 43 | 77 |
| EX. 35 | VPG2 | 90 | 10 | 43 | 61 |
| CEX. 36 | SVP15 | 90 | 10 | 67 | 24 |
| CEX. 37 | SVP16 | 90 | 10 | 69 | 39 |
| EX. 38 | VPG1 | 70 | 30 | 41 | 31 |
| EX. 39 | VPG2 | 70 | 30 | 39 | 23 |
| CEX. 40 | SVP15 | 70 | 30 | 71 | 24 |
| CEX. 41 | SVP16 | 70 | 30 | 66 | 34 |

Examples 42 to 47 of the present invention comprising blends of vinyl polymers having a gradient polymeric morphology (VPG7 to VPG12) with VP23 (vinyl polymer, small particle size, high Tg) were made in w/w % blend ratios of 90:10 as shown in Table 8 below.

Table 8 shows that the blends of various vinyl polymers having a gradient polymeric morphology with VP23 give a favourable MFFT/surface hardness balance combined with high elasticity and toughness.

TABLE 8

| VPG | VPG % | VP23 % | MFFT (° C.) | Surface hardness (s) | Elasticity (%) | Toughness (MPa) |
|---|---|---|---|---|---|---|
| Ex. 42 | VPG7 | 90 | 10 | 31 | 102 | 97 | 9.5 |
| Ex. 43 | VPG8 | 90 | 10 | 30 | 89 | 159 | 14.0 |
| Ex. 44 | VPG9 | 90 | 10 | 43 | 84 | 158 | 11.9 |
| Ex. 45 | VPG10 | 90 | 10 | 47 | 56 | 131 | 13.7 |
| Ex. 46 | VPG11 | 90 | 10 | 21 | 71 | 153 | 12.2 |
| Ex. 47 | VPG12 | 90 | 10 | 27 | 79 | 207 | 10.2 |

Examples 48 to 53 of the present invention comprising blends of vinyl polymers having a gradient polymeric morphology (VPG5, VPG6, VPG12 and VPG13) were blended in w/w % ratios as shown in Table 9 below with AP24, UP25, AP26 and UV-VP27.

The blend with UV-VP27 (Ex.49) was formulated with 0.18 gram of Darocure 1173 a photoinitiator available from Ciba Specialty Chemicals. The film was allowed to dry at room temperature until touch dry before a flash-off at 60° C. for 10 minutes followed by UV curing at 400 mJ (two times).

The blend with UP25 (Ex.50) was formulated with 10% ethylenediglycol (EDG).

The blend with AP24 (Ex.48) was formulated with 0.06 wt. % Co on AP24 solids as per recommendation by Bayer.

The blend with AP26 (Ex. 53) was formulated with 5% EDG.

Table 9 shows that up to 40 wt. % of component (B) gives coatings with a high elasticity, toughness and good MFFT surface hardness balance.

TABLE 9

| | VPG | AP, UP or UV-VP | VPG % | AP, UP or UV-UP % | MFFT (° C.) | Surface hardness (s) | Elasticity % | Toughness (MPa) |
|---|---|---|---|---|---|---|---|---|
| Ex. 48 | VPG5 | AP24 | 80 | 20 | <5 | 29 | 187 | 10.2 |
| Ex. 49 | VPG6 | UV-VP27 | 90 | 10 | <5 | 48 | 138 | 8.0 |
| Ex. 50 | VPG13 | UP25 | 90 | 10 | 40 | 79 | 78 | 12.3 |
| Ex. 51 | VPG5 | UP25 | 70 | 30 | <5 | 30 | 251 | 13.0 |
| Ex. 52 | VPG5 | UP25 | 60 | 40 | <5 | 34 | 258 | 14.5 |
| Ex. 53 | VPG12 | AP26 | 85 | 15 | 20 | 59 | 206 | 13.0 |

Comparative Examples 54 to 59 comprise blends of vinyl polymers having a gradient polymeric morphology (VPG7, VPG13 and VPG14) with more than 50 wt. % of VP23, UP25, AP24 and AP26, as shown in Table 10 below. The blends with VP23 (CEX.54 and CEX.55) were formulated with 20% EDG. Table 10 shows that having less than 50 wt. % of component (A) results in a very high MFFT and low elasticity, coatings that are too brittle or coatings with low hardness and toughness.

TABLE 10

| | VPG | VP, UP or AP | VPG % | VP, UP or AP % | MFFT (° C.) | Surface hardness (s) | Elasticity (%) | Toughness (MPa) |
|---|---|---|---|---|---|---|---|---|
| CEX. 54 | VPG7 | VP23 | 40 | 60 | 69 | 120 | 66 | 12.7 |
| CEX. 55 | VPG7 | VP23 | 20 | 80 | <90 | 107 | 47 | 10.7 |
| CEX. 56 | VPG13 | UP25 | 30 | 70 | <5 | 94 | Too brittle | Too brittle |
| CEX. 57 | VPG13 | UP25 | 35 | 65 | <5 | 90 | Too brittle | Too brittle |
| CEX. 58 | VPG13 | AP24 | 35 | 65 | <5 | 115 | Too brittle | Too brittle |
| CEX. 59 | VPG14 | AP26 | 40 | 60 | 11 | 17 | 119 | 1.6 |

The invention claimed is:

1. An aqueous composition comprising water and no more than 15 wt. % of co-solvent based on the weight of the below-named components (A) and (B), in admixture with components:
    (A) 70 to 90 wt. % of a vinyl polymer(s) having a gradient polymeric morphology; and
    (B) 10 to 30 wt. % of at least one polymer not having a gradient polymeric morphology;
    wherein component (A) is separately prepared and thereafter blended with component (B) and components (A) and (B) add up to 100%.

2. An aqueous composition according to claim 1 wherein component (A) is obtained by the polymerisation of at least a first monomer feed and a different second monomer feed.

3. An aqueous composition according to claim 2 wherein component (A) is obtained from a process comprising introducing a first monomer feed to a reactor, where the first monomer feed continually varies in its composition due to the addition of a different second monomer feed to the first monomer feed and polymerising the monomers introduced into the reactor.

4. An aqueous composition according to claim 2 wherein component (A) is obtained from a process comprising simultaneously introducing a first monomer feed and a different second monomer feed into a reactor where the rate of introduction of the first monomer feed varies with respect to the rate of introduction of the second monomer feed and polymerising the monomers introduced into the reactor.

5. An aqueous composition according to claim 2 where the weight ratio of the first monomer feed to the different second monomer feed is in the range of from 70:30 to 30:70.

6. An aqueous composition according to claim 5 where either the first monomer feed and/or the second monomer feed comprises composition (a):
    i) 10 to 90 wt. % of $CH_2$=$R^1COOR^2$ where $R^1$ is H or methyl and $R^2$ is optionally substituted alkyl or cycloalkyl of 4 to 20 carbons atoms;
    ii) 0 to 40 wt. % of styrene;
    iii) 0 to 15 wt. % of acid functional vinyl monomer(s);
    iv) 0 to 10 wt. % of crosslinking functional vinyl monomer(s);
    v) 0 to 5 wt. % of chain transfer agent(s)
    vi) 0 to 20 wt. % of vinyl monomer(s) not in i) to vi) where i)+ii)+iii)+iv)+v)+vi) add up to 100%;
    and wherein said second monomer feed is different from said first monomer feed.

7. An aqueous composition according to claim 5 where either the first monomer feed and/or the second monomer feed comprises composition (b):
    i) 10 to 90 wt. % of $CH_2$=$CR^1$—$COOR^2$ where $R^1$ is H or methyl and $R^2$ is optionally substituted alkyl or cycloalkyl of 1 to 20 carbon atoms;

ii) 0 to 40 wt. % of styrene;
iii) 2 to 20 wt. % of acid functional monomer(s);
iv) 0 to 30 wt. % of crosslinking functional monomer(s);
v) 0 to 10 wt. % of chain transfer agent(s);
vi) 0 to 20 wt. % of vinyl monomer(s) not in i) to vi);
where i)+ii)+iii)+iv)+v)+vi) add up to 100%; and
wherein said second monomer feed is different from said first monomer feed.

8. An aqueous composition according to claim 1 wherein component (A) is obtained from a seeded polymerisation process.

9. An aqueous composition according to claim 6 or claim 7 where component (B) is selected from the group comprising:
   (i) vinyl polymer(s) having a Tg$\geq$50° C. and a particle size$\leq$150 nm;
   (ii) water-dissipatable polyurethane(s);
   (iii) UV curable polymer(s); and
   (iv) autoxidisably crosslinkable polymer(s).

10. A coating composition comprising an aqueous composition according to claim 1.

11. A coating obtained from an aqueous composition according to claim 1.

12. An adhesive obtained from an aqueous composition according to claim 1.

13. A substrate coated with an aqueous composition according to claim 1.

14. An aqueous composition according to claim 1 containing not more than 1% by weight of co-solvent based on the weight of components (A) and (B).

15. An aqueous composition according to claim 14 having a solids content of about 20 to 60% by weight.

* * * * *